US010171534B2

United States Patent
Major et al.

(10) Patent No.: US 10,171,534 B2
(45) Date of Patent: *Jan. 1, 2019

(54) PLACESHIFTING OF ADAPTIVE MEDIA STREAMS

(71) Applicant: DISH TECHNOLOGIES L.L.C., Englewood, CO (US)

(72) Inventors: Darren Major, Pleasant Grove, UT (US); Mark B. Hurst, Cedar Hills, UT (US)

(73) Assignee: DISH TECHNOLOGIES L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/692,910

(22) Filed: Aug. 31, 2017

(65) Prior Publication Data

US 2018/0034875 A1 Feb. 1, 2018

Related U.S. Application Data

(63) Continuation of application No. 13/837,108, filed on Mar. 15, 2013, now Pat. No. 9,756,100.

(51) Int. Cl.
| | |
|---|---|
| *G06F 15/16* | (2006.01) |
| *H04L 29/06* | (2006.01) |
| *H04L 29/08* | (2006.01) |
| *H04N 21/436* | (2011.01) |
| *H04N 21/637* | (2011.01) |
| *H04N 21/643* | (2011.01) |
| *H04N 21/845* | (2011.01) |

(52) U.S. Cl.
CPC .......... *H04L 65/60* (2013.01); *H04L 65/1069* (2013.01); *H04L 65/1093* (2013.01); *H04L 65/4084* (2013.01); *H04L 67/2814* (2013.01); *H04L 67/2842* (2013.01); *H04N 21/436* (2013.01); *H04N 21/637* (2013.01); *H04N 21/64322* (2013.01); *H04N 21/8456* (2013.01); *H04L 67/2823* (2013.01)

(58) Field of Classification Search
CPC .................. H04L 67/104; H04N 21/43615
See application file for complete search history.

(56) References Cited

U.S. PATENT DOCUMENTS

| | | | | |
|---|---|---|---|---|
| 9,756,100 | B2 * | 9/2017 | Major | H04L 65/60 |
| 2005/0262257 | A1 * | 11/2005 | Major | H04N 21/25808 709/231 |
| 2011/0320559 | A1 * | 12/2011 | Foti | H04L 65/605 709/217 |

OTHER PUBLICATIONS

USPTO, Notice of Allowance and Fee(s) Due in U.S. Appl. No. 14/137,168 dated Sep. 13, 2017.

* cited by examiner

*Primary Examiner* — Yves Dalencourt

(74) *Attorney, Agent, or Firm* — Lorenz & Kopf LLP

(57) ABSTRACT

Systems, devices and methods are provided to support placeshifting of adaptive media streams. A home device acts as an intermediary that passes requests for segments of an adaptive stream from a remote device to a content source. The content source responds with the requested segments, which are forwarded to the remote device. A connection service may be provided to facilitate placeshifting sessions between home and remote devices.

20 Claims, 3 Drawing Sheets

PLACESHIFTING OF ADAPTIVE MEDIA STREAMS

TECHNICAL FIELD

Figure 1:
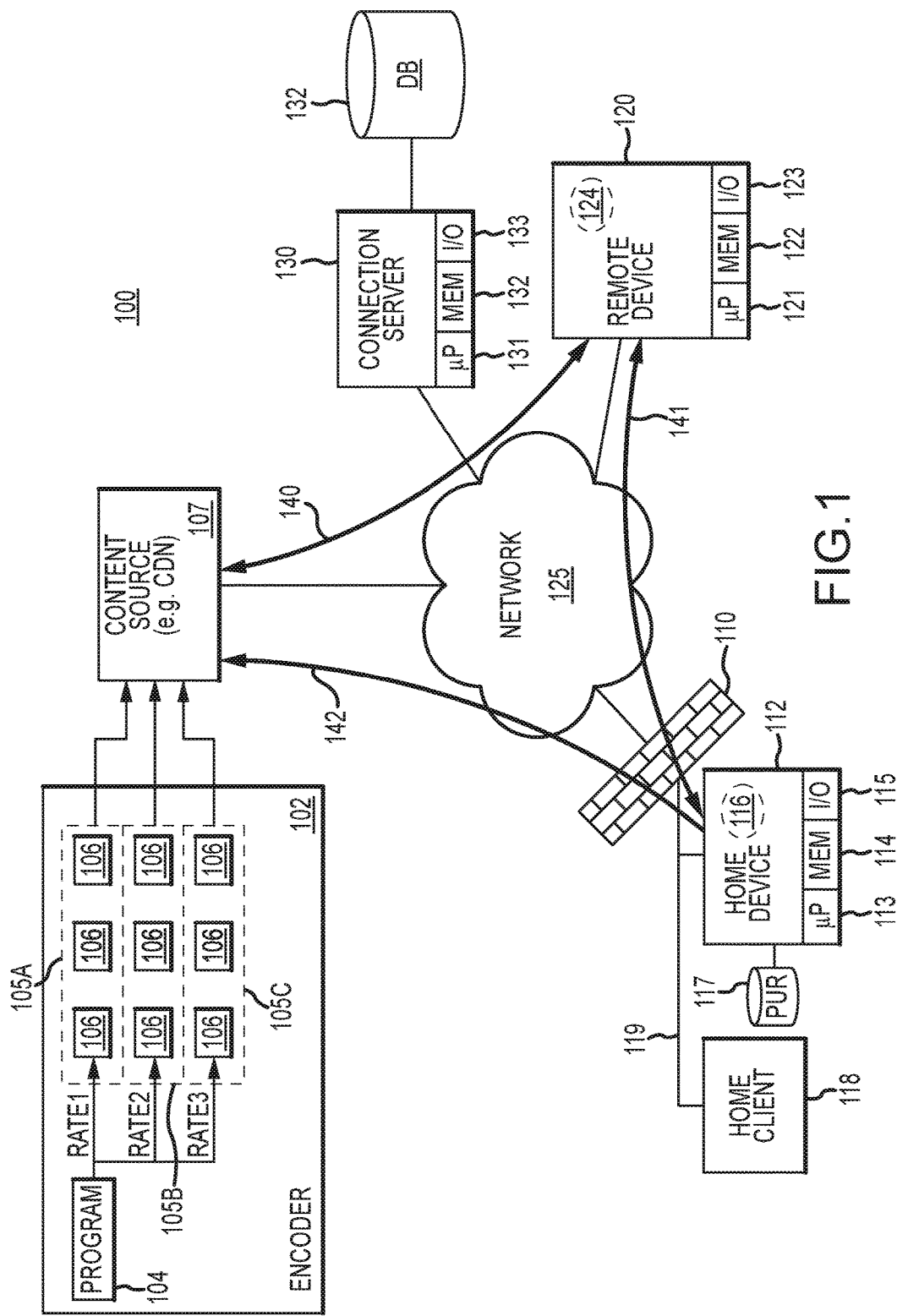

The present disclosure generally relates adaptive media streaming, and more particularly relates to systems, devices and methods involving placeshifting of adaptive media streams.

BACKGROUND

Streaming media is commonly used to deliver television programs, movies and other digital media content over the Internet and other networks. At present, a variety of streaming audio, video and/or other media content is available to consumers from any number of diverse sources. A large amount of video-on-demand (VOD) content, for example, is now available for network streaming from many different sources. Media streams are also used to deliver other types of media content including live and pre-recorded broadcast television, so-called "Internet (or IP) television", stored media content (e.g., content stored in a remotely-located digital video recorder (DVR)), placeshifted media content and many others.

More recently, adaptive techniques have been developed to improve the performance of many media streaming applications. Typically, an adaptive media stream is encoded at different bit rates into multiple sets of "streamlets" or other smaller segment files that can be individually requested and adaptively delivered to a particular client device. As changes in processing resources, network bandwidth and/or other factors occur, the client device is able to adapt to the changes by requesting future segments that are encoded with different quality parameters (e.g., a higher or lower bit rate). Adaptive streaming is therefore relatively flexible in responding to different network conditions. A common disadvantage of adaptive streaming, however, is that content needs to be encoded multiple ways at different bit rates which typically need to be made available so that the client can mix and match segments between copies as needed. Several examples of adaptive streaming systems and techniques are described in US Patent Publication No. 2008/0195743, which is incorporated herein by reference, although other techniques could be equivalently used.

Consumers have also expressed significant interest in placeshifting of media programming from one viewing location to another. In a typical placeshifting application, a program that would ordinarily be shown on the viewer's home television is instead transported to a phone, tablet, portable computer or other device at a different location. Placeshifting can be used to provide remote access to programming stored on a viewer's personal video recorder (PVR), for example, or to shift viewing of live programs from one television set to another, or for any number of other useful purposes. Traditionally, placeshifted media streams are encoded in real time as they are transmitted to the remote device.

Substantial difficulties can arise, however, in placeshifting an adaptive media stream. Adaptive streams typically rely upon the simultaneous availability of multiple pre-encoded copies of the media program; these multiple copies can be difficult to produce in real time to support conventional placeshifting applications.

It is therefore desirable to create systems, device and methods to reliably, effectively and securely placeshift adaptive media streams between media devices. These and other desirable features and characteristics will become apparent from the subsequent detailed description and the appended claims, taken in conjunction with the accompanying drawings and this background section.

BRIEF SUMMARY

Various exemplary embodiments provide client or server systems, processing devices and/or techniques to placeshift adaptive media streams. In various embodiments, a media player, set top box, video game player or other home device acts as an intermediary that passes requests for segments of an adaptive media stream from a remote device to a content source. The content source serves the requested segments to the home device, which in turn forwards the segments to the remote device. This allows the media stream to be placeshifted from the home device to the remote device while retaining the benefits of adaptive streaming.

Some embodiments provide home devices and/or associated methods to placeshift an adaptive media stream comprising a plurality of segments to a remote device. In operation, the home device suitably initiates a gateway that allows a connection to be established from the remote device to the home device via the network. A series of segment requests are received at the home device via the connection to the remote device, wherein each of the series of segment requests identifies one of the plurality of segments of the adaptive media stream available from a content source that is selected by the remote device. The home device obtains the segment that is identified in each of the series of segment requests from the content source, and forwards each of the obtained segments from the home device to the remote device to thereby allow the remote device to assemble each of the identified segments of the adaptive media stream for playback on the remote device.

Other embodiments provide remote devices and associated methods for receiving and processing a placeshifted adaptive media stream. Still other embodiments provide systems, devices and methods for managing connections between home devices and remote devices. These and other embodiments, aspects and features are described in detail below.

BRIEF DESCRIPTION OF THE DRAWING FIGURES

Figure 2:
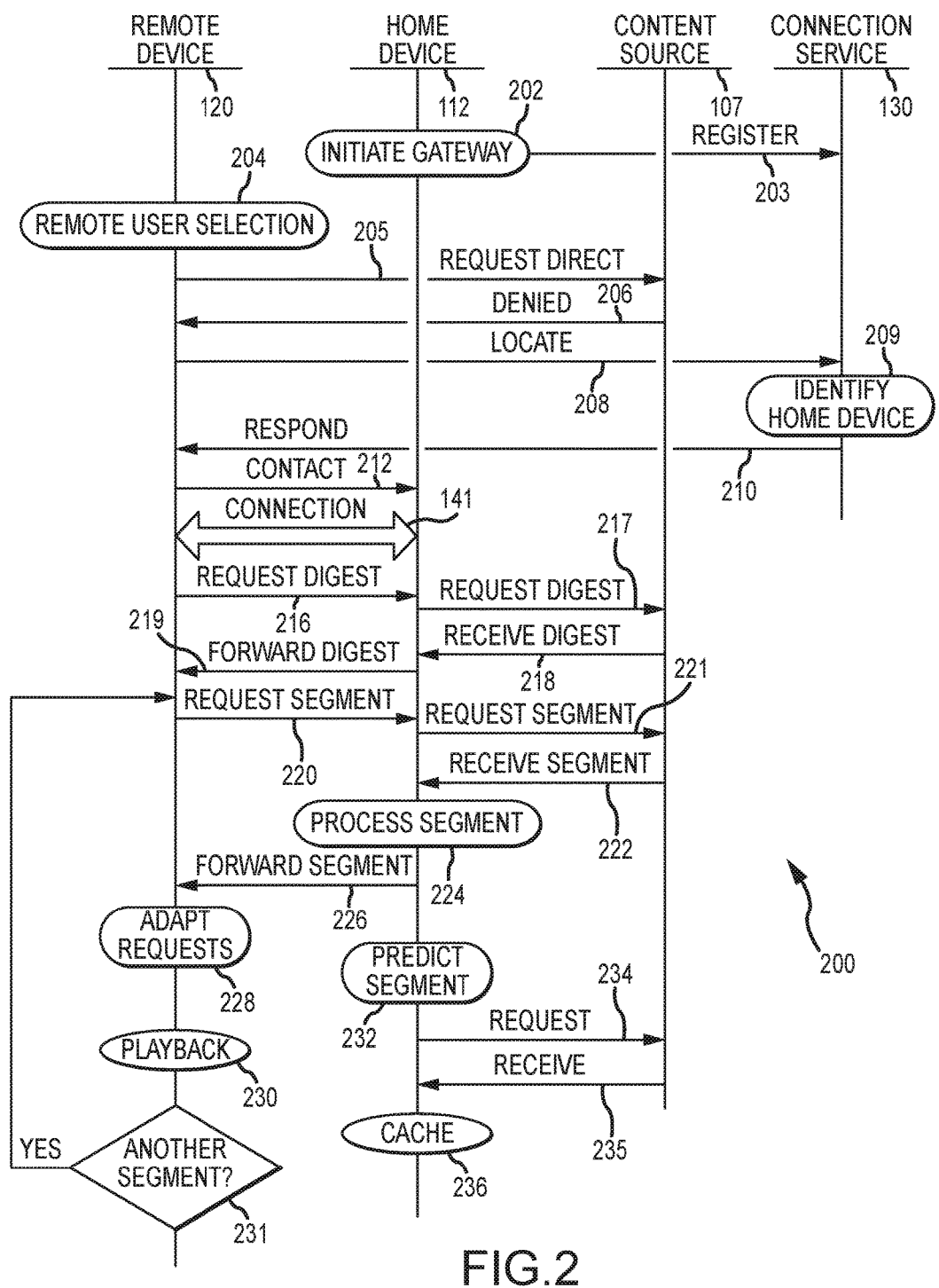

Exemplary embodiments will hereinafter be described in conjunction with the following drawing figures, wherein like numerals denote like elements, and FIG. 1 is a block diagram of an exemplary system for placeshifting an adaptive media stream; and FIG. 2 is a message flow diagram showing an exemplary process for placeshifting an adaptive media stream.

Figure 3:
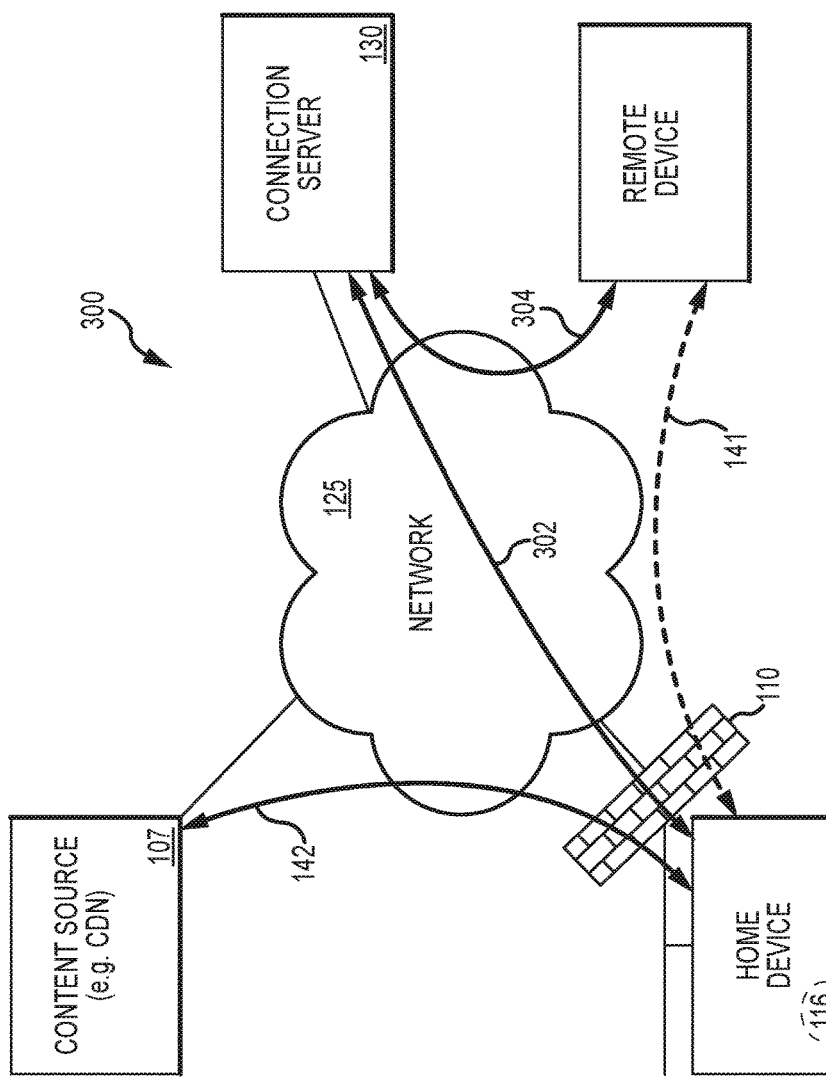

FIG. 3 shows an example of a system 300 in which communications between remote device 120 and home device 112 are relayed through connection service 130.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a remote device is able to obtain and view an adaptive media stream by using a home media player, set top box or other home device as an intermediary. Rather than requesting segments of an adaptive stream directly from the content source, the remote device requests segments from the home device, which then obtains the segment requests from the content source on behalf of the remote device. When the content source provides the requested media segment to the home device, the home device forwards the received segment to the remote device as appropriate. The home device therefore acts as a pass-through for exchanging segment requests and received segments between the content source and the remote device. The home device could also display the video stream, if desired by the user. This method allows the adaptive media stream to be effectively placeshifted from the home device to the remote device while retaining the substantial performance benefits of adaptive streaming.

Turning now to the drawing figures, FIG. 1 illustrates an exemplary system 100 to support placeshifting of adaptive media streams from a content source 107 to a mobile phone, tablet, portable computer or other remote device 120. In the illustrated example, the remote device 120 may initially attempt to obtain a desired media stream 140 directly from the content source. In some implementations, content source 107 may allow streaming of certain programs to mobile devices, but not for other programs. Certain television networks, for example, may wish to limit distribution of their programs to tablets, phones and other mobile devices even though they are willing to allow streaming to home-based devices such as home computers, television receivers, media players or the like.

If a direct stream 140 to the remote device 120 is not allowed for any reason, then then remote device 120 instead establishes a connection 141 with a home media player, set top box or other home device 112 that is associated with the same user as the remote device 120. This connection 141 may be facilitated by a connection server 130 operating as a service on network 125, as explained more fully below. After the connection 141 is established, then the home device 112 is able to communicate 142 with the content source and to act as an intermediary for obtaining segments 106 of the adaptive stream from the content source 107 and for forwarding the obtained segments to the remote device 120. The adaptive media stream 142 is thusly placeshifted from home device 112 to the remote device 120, thereby allowing the requested content to be provided on the remote device 120.

The various components of system 100 may be deployed under the control of different entities. In some implementations, encoder 102, content source 107 and connection server 130 are jointly operated by a content distributor such as a cable television operator, a direct broadcast satellite (DBS) service provider, broadcast network, or the like. Such a distributor would typically support multiple customers, each with their own home devices 110 and remote devices 120. Other embodiments could separate the encoding, distributing and operating functions between different parties. A television network or other content producer could provide already-encoded media streams, for example, that could be made available via a commercially-available content delivery network (CDN) or other server while a distributor or other party maintains control of the system 100 via connection server 130.

Remote devices 120 could represent any sort of mobile phone, tablet PC, laptop or other PC, video game device, media player, or other consumer-type device that is operated by a user at a location away from his or her home location. Remote devices 120 are able to obtain and playback media content, including adaptive media streams that originate with content source 107. Typically, remote devices 120 will include any conventional processors 121, memory 122 and input/output interfaces 123 for supporting interactions with the user and/or connections to network 125, as well as any other conventional resources commonly found in consumer-type computers and other electronic devices. It is not necessary that all remote devices 120 be mobile devices; more stationary PCs, media players, video game players, televisions, television receivers and/or other components may be considered "remote devices" if they are located at physical or network locations that are distinct from the user's home location.

Home device 112 is any sort of device or component that is located at the user's home location and that is capable of processing adaptive media streams as described herein. Typically, home device 112 is a consumer-type device that includes a conventional processor 113, as well as memory 114 and input/output features 115 (e.g., user and network interfaces), in additional to any other hardware, software and/or firmware components that are commonly associated with conventional consumer electronics or computing devices. Various embodiments could implement home device 112 within a media player, set top box, television receiver, video game player, audio or video processor, television and/or any other consumer-type device. Home device 112 could also be implemented using a personal computer or the like that is located at the user's home location. In various embodiments, the home device functionality described herein is incorporated into an otherwise-conventional set top box that is provided by a television content distributor.

Home device 112 typically incorporates a software or firmware program 116 that resides in memory 114 and that is executable by processor 113 to perform the various functions described herein. In various embodiments, program 116 performs the various functions described herein relating to obtaining media segments 106 from content source 107 and placeshifting the obtained segments 106 to remote device 120.

In some implementations, home device 112 includes (or at least communicates with) a storage device 117 such as a hard disk drive, memory or the like. Storage device 117 may be used in implementing a personal video recorder (PVR), for example, that stores received programming for later viewing. Storage device 117 may also be used for caching media segments that may not have been requested by the remote device 120 in some implementations, as described more fully below.

Home device 112 generally operates on a home-type network 119, such as a local area network (LAN) behind a router or similar device 110. Typically, router 110 provides a firewall that blocks undesired traffic from network 125 while allowing outgoing traffic from home network 119. For a remote device 120 to contact home device 112 via network 125, then, a gateway or the like is opened so that incoming messages can be provided to the home device 112, as described more fully below. Home network 119 may also include local media players or other home client devices 118 capable of receiving adaptive media streams, as desired.

Adaptive media streams may be created and distributed in any manner. As shown in FIG. 1, encoder 102 is any device or service capable of encoding media programs 104 into one or more adaptive streams 105A-C. Encoder 102 may be, for example, a digital computer system that is programmed to create multiple streams 105A-C each representing a media program 104 in its entirety, but with different bit rates, frame rates, resolution and/or other levels of quality. Typically, each stream 105A-C is made up of smaller segments 106 that each represent a small portion of the program content with a single data file. Each stream 105A-C is typically encoded so that segments 106 of the different streams 105A-C are interchangeable with each other, often using a common timing index. This allows a client media player to mix and match segments 106 from different streams 105A-C to create a media stream that effectively adapts as network conditions or other conditions change. Other embodiments could use different encoding structures or techniques, as desired.

The sets of segments 106 making up each stream 105 are stored on a content delivery network (CDN) or other content source 107 for distribution on the Internet or another network 125. Typically, a media player application 124 executing on one or more client devices 120 contains intelligent logic to select appropriate segments 106 as needed to obtain and playback the media program 104. As noted above, segments 106 may be interchangeable between streams 105 so that higher quality segments 106 may be seamlessly intermixed with lower quality segments 106 to reflect changing network or other conditions in delivery over network 125. In some implementations, the media player 124 initially obtains a digest or other description of the available segments 106 so that the player itself can select and request the particular segments 106 that are desired. Since the segments 106 are typically stored as separate files, segment requests may take the form of conventional hypertext transport protocol (HTTP) constructs (e.g., HTTP "get" instructions) or the like. Such constructs are readily routable on network 125 and can be served by conventional CDN or other web-type servers no, thereby providing a convenient mechanism for distributing adaptive media streams to a variety of different client devices on network 125.

Typically, the customer or other user desires to view a television program, movie or other streamed media content from content source 107 using remote device 120. In some implementations, the remote device 120 may initially attempt to obtain the desired stream 140 directly from content source 107. If licensing restrictions, business rules, technical limitations or other factors prevent a direct stream 140, however, then the remote device 120 suitably locates and contacts a home device 112 that can placeshift the desired adaptive stream to the remote device.

In various embodiments, a connection server 130 is provided to locate the user's home device 112 on network 125. To that end, connection server 130 is a computerized service that facilitates data connections 141 between remote devices 120 and home devices 112 operated by various users. In many implementations, connection server 130 executes on a conventional server or other digital computer that includes a processor 131, memory 132, input/output interfaces 133 (e.g., an interface to network 125), and/or the like. Equivalent embodiments could implement some or all of connection server 130 using cloud-based computing resources or the like.

Connection server 130 typically operates in conjunction with a database 132 that associates customers or other users with their particular home devices 112, and that maintains a current network address that can be used to contact the home device 112 for placeshifting connections 141. As users of remote devices 120 identify themselves to server 130, their home devices 112 can be located and contacted, as described more fully below. Database 132 may additionally or alternately contain other information, such as information about the type, location or address of remote device 120, as desired.

In operation, then, home device 112 initially establishes a gateway or other access through firewall no via network 125. Typically, home device 112 registers with connection service 130 to provide an address that can be used to establish subsequent placeshifting sessions. This access can be made by opening a port on the firewall using services such as universal plug-and-play (UPnP) or the like. Access could alternately be made via network address translation (NAT) hole punching techniques, or using any other techniques. When a remote device 120 attempts to obtain a placeshifted stream, connection service 130 is able to provide the remote device 120 with information to establish a placeshifting session 141 with the user's home device 112. The home device 112 then communicates with the remote device 120 and with the content source 107 to obtain segments 106 of the adaptive stream 142 on behalf of remote device 120.

FIG. 2 provides additional detail about an exemplary process 200 to placeshift an adaptive media stream, including functions performed by various devices and messages passed between devices as desired. The exemplary process 200 may be supplemented or modified to create any number of equivalent implementations.

In the embodiment illustrated in FIG. 2, the home device 112 initially opens a gateway in firewall 110 so that connections can be received from network 125 (function 202). In some implementations, the gateway could be implemented as a universal plug-n-play (UPnP) gateway in accordance with the Internet Gateway Device (IGD) protocol or the like. Such a gateway automatically configures port forwarding through router no to allow incoming connections to home network 119. In other embodiments, home device 112 could initially establish a persistent connection (e.g. a TCP connection) with connection server 130 or another messaging service that is maintained over time so that the server 130 can send instructions to the home device as desired. Several examples of persistent connection techniques are described in US Patent Publication No. 2011/0119325, although other techniques could be equivalently used. Access can also be made via NAT hole punching techniques, or any other techniques as desired. Several examples of NAT hole punching are provided in U.S. Pat. No. 8,149,851, although any other techniques could be equivalently used. In various embodiments, the home device 112 is configured in firmware or the like to establish the gateway on startup so that access is available whenever home device 112 is active. Typically, home device 112 registers an address and port number of the gateway with connection service 130 (function 203) to facilitate subsequent placeshifting connections with remote devices 120.

The user selects programming for viewing in any manner (function 204). In some implementations, content selections are presented in a web browser or other application executing on remote device 120. The viewer simply selects the desired program 104 available from content source 107 using conventional user interface features of the remote device 120. As noted above, the selected programming could include video on demand content such as live or prerecorded television programs, movies, or any other media content as desired.

In some implementations, remote device 120 could initially attempt to obtain an adaptive stream 140 directly from content source 107 (function 205). If a direct stream 140 is not available due to licensing restrictions or other factors, however, then the content source 107 will deny the connection (function 206). Requests for direct connections 140 could be equivalently approved or rejected by connection service 130 on behalf of content source 107. In such embodiments, connection service 130 would authorize and/or approve requests 205 and notify content source 107 of approved requests 205 so that the direct connections 140 could be established.

If a direct streaming connection 140 is not allowed for any reason, then the remote device 140 suitably queries connection service 130 to locate one or more placeshifting alternatives (function 208). Connection service 130 suitably identifies the home device 112 that is associated with the user requesting the connection (function 209), and responds with a current address for the identified device 112 on network 125 (function 210). The current address may be, for example, an internet protocol (IP) address and port number that is associated with the previously-established gateway. In an embodiment that uses pre-existing connections to home devices 112 instead of gateways, connection service 130 could use a previously-established persistent connection to direct the home device 112 to contact the remote device 120, thereby allowing the placeshifting session to be established as an outgoing connection from the home device 112 to the remote device 120.

In some situations, multiple placeshifting options may be available from different sources. Connection server 130 could provide multiple addresses to the remote device 120, if the user or the remote device 120 is associated with multiple home devices 112. Multiple addresses may be provided in series to allow the remote device 120 to first attempt connection to a preferred placeshifting device before attempting other connections. Alternately, multiple address could be simultaneously provided to the remote device 120 as desired.

Connection server 130 may additionally authenticate the user with a userid/password combination, a biometric factor, a digital code stored on or otherwise associated with the user's remote device 120, and/or any other credential. Connection server could further authorize particular transactions between remote devices 120 and home devices 112 based upon information stored in a subscriber or customer database 132, or the like. Some implementations may further process billing or other accounting functions using connection service 130, as desired. Billing may be useful, for example, in a "pay per connection" system, or the like. In one example, the user may be a subscriber to a DBS, cable or other pay television service. In such embodiments, the connection service 130 may request identification information from the user so that a particular set top box or other home device 112 associated with the user's television subscription can be identified and located on network 125. Connection server 130 is able to reject placeshifting sessions by simply withholding contact information about home device 112 from the remote device, or alternatively by refusing to grant digital credentials that would be otherwise required by the home device. Any number of session authentication or authorization techniques could be applied by connection server 130, as desired.

In the embodiment shown in FIG. 2, the remote device 120 uses the address information 210 received from the connection server 130 to contact one or more home devices 112 (function 212) and thereby establish a placeshifting connection 141. The placeshifting session itself may be established using any conventional media streaming techniques, with the home device 112 acting as the "server" and the remote device 120 acting as the "client" to the media stream. In various embodiments, the media player application 124 may not be fully aware that it is requesting adaptive segments 106 from an intermediating device 112. That is, the media player application 124 suitably requests segments 106 of the adaptive stream from home device 112, but otherwise operates as if it were requesting segments 106 directly from the content source 107. The home device 112, conversely, acts as a media streaming client to obtain the adaptive stream from the content source while simultaneously serving the received segments 106 to the remote device 120. To that end, the content source 107 may not be aware that the requested segments 106 are being provided to remote device 120 or any device other than home device 112. This allows for convenient placeshifting of the programming 104 from home device 112 to remote device 120 in a relatively seamless manner, while retaining the efficiencies of adaptive streaming.

To that end, the media player 124 at remote device 120 initially requests a digest or other summary of the various segments 106 that are available for the selected program (function 216). The remote device 120 will also identify the selected program 104 to the home device 112 to allow home device 112 to obtain the appropriate data from source 107, as desired. This allows the home device 112 to request the digest for the appropriate program 104 from content source 107 (function 217), and to receive the requested digest from the content source (function 218). The received digest is passed through the home device 112 and forwarded on to the remote device 120 (function 219).

Typically, the digest will contain information identifying the various streams 105A-C that may be available for the particular program 104, along with URL or other naming conventions identifying the various segments 106 of each stream 105A-C. This allows media player application 124 at remote device 120 to request appropriate segments 106 of the various streams 105A-C using conventional adaptive streaming techniques.

The media player application 124 in remote device 120 therefore processes the data contained in the digest to select and request appropriate segments 106 of the adaptive media stream 105 (function 220). These segment requests are received at application 116 of the home device 112, which suitably forwards the request to content source 107 (function 221) to obtain the requested segment 106 selected by the remote device 120. When the requested segment 106 is received from the content source 107 (function 222), the received segment 106 can be passed through home device 112 and forwarded to the remote device 120 as desired (function 226). As noted above, the requesting and delivery of segments 106 between remote device 120, home device 112 and content source 107 may be implemented using conventional HTTP "get" and "put" constructs, or similar constructs that are readily routed on network 125.

The remote device 120 adapts its segment requests using conventional adaptive streaming techniques (function 228). As network or computing resources change, for example, application 124 appropriately requests higher or lower quality segments 106 to maintain a suitable user experience. Segments 106 are requested in series (function 231) to maintain a stream of segments that can be decoded and played back (function 230) by the remote device 120 to render the selected program 104 for the user. Note that playback may be provided on a display associated with the remote device 120 itself (e.g., a display of a tablet computer or mobile phone), or on an external display (e.g., a television coupled to a separate media player device).

In many implementations, the home device 112 simply acts as an intermediary that passes segment requests and received segments between remote device 120 and content source 107. It is not necessary that the home device 112 perform any additional processing on the received requests or media segments other than simply forwarding them along to their ultimate destinations. In various embodiments, however, home device 112 could perform additional processing related to segments 106 as desired (function 224). Home device 112 could perform any sort of encrypting, transcoding or other modification of the received segments 106, for example, if such features are desired.

Still other embodiments could implement a prediction feature (function 228) on home device 112 to reduce latency in transporting segments 106 from content source 107 to remote device 120. To implement this feature, application 116 or other logic executing at home device 112 suitably predicts which segments 106 are likely to be requested in future segment requests 220 received from the remote device 120. Future segments 106 can be predicted based upon the segments requested in the past. If the remote device 120 repeatedly requests segments 106 from the same quality level stream 105A-C, for example, then future segments 106 from that same stream could be requested (function 234), received (function 235) and cached in storage device 117 or elsewhere (function 236). Even if remote device 120 is requesting segments 106 from different streams 105A-C, home device 112 might obtain and cache multiple segments 106 that represent the same time slot of the program 104 in varying quality levels, with the expectation that only one of the cached segments will eventually be used. The general concept of predicting and caching segments 106 at home device 104 could be expanded as desired. Prediction may be particularly useful if the remote device 120 has a slower connection (e.g., a telephone connection) to network 125 than home device 112. In such situations, the additional bandwidth available to the home device 112 can be leveraged to reduce latency and potentially improve the user experience.

FIG. 2 therefore provides an exemplary process 200 to placeshift an adaptive media stream. Many of the functions shown in FIG. 2 may be carried out using programmable software code executed by a computer system, such as home device 112, remote device 120 and/or connection server 130 as appropriate. The software code used to implement the various functions may be stored in memory, disk storage or other non-transitory storage available to the appropriate computer system, and may be executed by any conventional microprocessor, microcontroller or other programmable circuitry. Equivalent embodiments may supplement, modify and/or differently arrange the various functions shown in FIG. 2 in any manner.

In some embodiments, it may be relatively difficult for remote device 120 to establish a direct connection 141 (FIG. 1) with home device 112 due to firewall 110 and/or any other impediments that may be encountered on network 125. Since both home device 112 and remote device 120 are typically consumer-operated devices that may not have static IP addresses and/or may be otherwise difficult to locate on network 125, it may be easier in some implementations for both devices 112 and 120 to instead locate and contact connection server 130, which then acts as a relay or proxy to forward communications between home device 112 and remote device 120.

FIG. 3 shows an example of a system 300 in which communications between remote device 120 and home device 112 are relayed through connection service 130. As shown in FIG. 3, a direct connection 141 between remote device 120 and home device 112 may not be possible. If the home device 112 and remote device 120 can both establish outgoing connections to a well-known server 130, however, then the server 130 can relay messages between the two devices 112, 120 as needed. In such embodiments, home device 112 suitably establishes a direct connection 302 to the connection service 130. Connection 302 may be created at startup of device 112, or at another time prior to remote device 120 wishing to establish a placeshifting session. Connection 302 may persist over time (e.g., using TCP keepalive packets or the like) so that connection service 130 is able to transmit messages to the home device 112 as needed.

When remote device 120 attempts to create a placeshifting session with home device 112, it may first attempt a direct connection 141 as described above. If a direct connection 141 is not available, however, then the remote device 120 instead establishes a connection 304 to connection service 130. Connection service 130 then acts as a relay to forward segment requests 220, segment deliveries 226 and/or other communications as needed. To that end, the two direct connections 302 and 304 may be considered as a virtual connection and equivalent to connection 141 as described above.

In such embodiments, the communications shown in FIG. 2 as being passed between the remote device 120 and home device 112 would be equivalently passed through the connection service 130. Segment requests 220, for example, would be sent from remote device 120 to connection service 130, which would then forward the request 220 on to home device 112. Conversely, the segments 106 received at home device 112 via connection 142 in function 222 would be sent to connection server 130, which appropriately forwards the segment 106 to the remote device 120 in an equivalent to function 226. Similarly, the delivery of digests or other data could proceed as shown in FIG. 2, with communications in each direction being forwarded by connection service 130 as needed. Forwarding media content from content source 107 through both home device 112 and connection service 130 may add computing, networking and administrative overhead in comparison to a direct connection 140 or 141. Establishing connections 302, 304 with service 130, however, should be substantially more easier to accomplish in most environments than directly connecting two consumer devices 112 and 120. Moreover, the adaptive streaming techniques described herein may be very well suited to compensating for any delays or bottlenecks that might be encountered while passing communications through system 300. If a direct connection 141 is not readily available, then relaying communications through connection service 130 may be an acceptable alternative.

The foregoing discussion therefore considers various systems, devices and methods to placeshift an adaptive media stream from a home device to a remote device. The general concepts set forth herein may be adapted to any number of equivalent embodiments. Although the discussion herein frequently considers network 125 to be the Internet or a similar network, for example, equivalent concepts could be applied to other public/private/hybrid networks, telephone networks, and/or the like. Many other enhancements, modifications and other changes could be made in a wide array of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a home device to placeshift an adaptive media stream comprising a plurality of segments to a remote device via a network, the method comprising:
   establishing a connection with the remote device via the network;
   receiving, by the home device, a series of segment requests from the remote device via the connection, wherein each of the series of segment requests identifies one of the plurality of segments of the adaptive media stream available from a content source, wherein the segments identified in the segment requests are selected by the remote device;
   obtaining, by the home device, the segment that is identified in each of the series of segment requests from the content source; and
   forwarding each of the obtained segments from the home device to the remote device to thereby allow the remote device to assemble each of the identified segments of the adaptive media stream for playback on the remote device.

2. The method of claim 1 further comprising receiving a program identifier from the remote device at the home device via the connection prior to receiving the series of streamlet requests, wherein the program identifier identifies a particular media program represented by the media stream.

3. The method of claim 2 further comprising the home device:
   obtaining a segment digest from the program source, wherein the segment digest corresponds to the particular media program identified by the program identifier; and
   forwarding the segment digest to the remote device to thereby allow the remote device to select segments of the adaptive media stream.

4. The method of claim 1 wherein the home device creates a gateway by establishing a connection to a remote connection service separate from the remote device on the network, and wherein the remote device initially contacts the remote connection service to obtain a network address of the gateway for establishing the connection.

5. The method of claim 1 wherein the obtaining comprises:
   predicting, by the home device, a predicted segment of the adaptive media stream that will be identified in a future segment request that has not yet been received by the home device based upon prior segments requested by the remote device; and
   requesting the predicted segment from the content source by the home device prior to the home device receiving the future segment request that identifies the at least one predicted segment.

6. The method of claim 5 further comprising the home device temporarily storing the predicted media stream prior to forwarding the obtained segments from the home device to the remote device.

7. The method of claim 1 wherein the obtaining comprises:
   obtaining, by the home device, a plurality of predicted segments of the adaptive media stream, wherein the predicted segments are selected by the home device based upon previous segments requested by the remote device; and
   storing the obtained predicted segments by the home device.

8. The method of claim 7 wherein the forwarding comprises, in response to a subsequent segment request from the remote device that identifies one of the obtained predicted segments, the home device forwarding the previously stored predicted segment from the home device to the remote device.

9. A home device to provide a placeshifted media stream comprising a plurality of segments to a remote device, the home device comprising:
   an interface to a network; and
   a processor configured to:
      establish a connection with the remote device;
      receive a series of segment requests via the connection with the remote device, wherein each of the series of segment requests identifies one of the plurality of segments of the adaptive media stream available from a content source, wherein the segments identified in the series of segment requests are selected by the remote device;
      obtain the segment identified in each of the series of segment requests from the content source; and
      forward each of the obtained segments from the home device to the remote device to thereby allow the remote device to assemble each of the identified segments of the adaptive media stream for playback on the remote device.

10. The home device of claim 9 further comprising a data storage device, and wherein the processor is further configured to:
    select a plurality of predicted segments of the adaptive media stream based upon previous segments requested by the remote device;
    obtain the selected predicted segments of the adaptive media stream from the content source;
    temporarily store the obtained predicted segments in the data storage device; and
    forward the stored predicted segment to the remote device in response to a subsequent segment request from the remote device that identifies one of the obtained predicted segments.

11. The home device of claim 9 wherein the home device is a set top box that receives broadcast television programming for viewing in a customer's home.

12. A method executable by a remote media player device to obtain a media program from a content source accessible to the remote media player device via a network, wherein the media program is represented by an adaptive media stream comprising a series of segments that are available from the content source via the network, the method comprising:
   establishing a connection with a home device via the network, wherein the home device is distinct from the content source;
   after connecting with the home device, the remote media player device selecting particular segments of the adaptive media stream representing the selected media program and requesting the particular segments from the home device via the connection to thereby allow the home device to obtain the adaptive media stream representing the selected program from the content source on behalf of the remote media player device;

receiving the particular segments of the media stream by the remote media player device; and assembling the received segments for playback to the user by the remote media player device.

13. The method of claim 12 further comprising:

initially requesting, by the remote media player device, the particular segments of the adaptive media stream representing the selected program directly from the content source via the network; and if the adaptive media stream representing the selected program is not obtainable directly from the content source, then the remote media player device performing the contacting of the connection service to obtain the address of the home device and the requesting of the particular segments from the home device.

14. The method of claim 12 further comprising the remote media player device receiving a segment digest corresponding to the selected media program from the home device, wherein the segment digest describes multiple segments available from the content source that are selectable by the remote media player, and wherein the selecting comprises selecting the particular segments from the multiple segments described in the segment digest.

15. The method of claim 12 wherein the remote device requests the particular segments from the home device via an indirect connection in which the connection service relays requests for particular segments to the home device.

16. The method of claim 15 wherein the remote device receives the particular segments from the home device via the indirect connection in which the connection service relays the particular segments from the home device to the remote device.

17. A remote media player device to play back an adaptive media stream for a user, wherein the adaptive media stream comprises a plurality of segments, the remote device comprising:

an interface to a network; and
a processor configured to:

establish a connection via the network with a home device that is associated with the user and that is distinct from the content source;

select, after locating the home device, particular segments of the adaptive media stream representing the selected media program;

request the particular segments of the adaptive media stream from the home device to thereby allow the home device to obtain the adaptive media stream representing the selected program from the content source on behalf of the remote media player device;

receive the particular segments of the media stream; and assemble the received segments of the adaptive media stream for playback to the user.

18. The remote media player device of claim 17 wherein the processor is further configured to receive a segment digest corresponding to the selected media program from the home device, wherein the segment digest describes multiple segments available from the content source that are selectable by the remote media player device, and to select the particular segments from the multiple segments described in the segment digest.

19. The remote media player device of claim 17 wherein the remote device is a mobile computing device carried by the user, and wherein the home device is a set top box located at the user's home that receives broadcast television content for the user.

20. The remote media player device of claim 17 wherein the particular segments are requested from the home device via an indirect connection in which the connection service relays requests for particular segments to the home device, and wherein the particular segments are received from the home device via the indirect connection in which the connection service relays the particular segments from the home device to the remote media player device.

* * * * *